United States Patent [19]

Wertheimer

[11] Patent Number: 4,583,887
[45] Date of Patent: Apr. 22, 1986

[54] ROTARY SLOT CUTTING TOOLS

[75] Inventor: Seev Wertheimer, Nahariya, Israel

[73] Assignee: Iscar Ltd., Nahariya, Israel

[21] Appl. No.: 496,410

[22] Filed: Sep. 1, 1983

Related U.S. Application Data

[63] Continuation of Ser. No. 205,047, Nov. 7, 1980, Pat. No. 4,417,833.

[51] Int. Cl.⁴ ............................................. B26D 1/00
[52] U.S. Cl. ...................................... 407/116; 83/845
[58] Field of Search .............. 407/116, 115, 117, 114; 83/844, 845

[56] References Cited

U.S. PATENT DOCUMENTS

| | | | |
|---|---|---|---|
| 2,422,111 | 6/1947 | Lundberg | 83/844 |
| 2,713,714 | 7/1955 | Krause | 407/117 |
| 2,891,300 | 6/1959 | Shephard | 407/117 |
| 2,994,350 | 8/1961 | Lundberg | 83/845 |
| 3,128,844 | 4/1964 | Scott | 407/115 |
| 3,364,544 | 1/1968 | Urbanic | 407/117 |

Primary Examiner—Leonidas Vlachos
Attorney, Agent, or Firm—Ladas & Parry

[57] ABSTRACT

Rotary slot cutting tools comprising disc shaped tools having cutting elements peripherally disposed on the discs. The cutting elements include chip forming means for narrowing the width of the chip below the width of slot being cut.

3 Claims, 16 Drawing Figures

ROTARY SLOT CUTTING TOOLS

This is a continuation of co-pending application Ser. No. 205,047 filed Nov. 7, 1980 now U.S. Pat. No. 4,417,833.

BACKGROUND OF THE INVENTION

This invention relates in general to cutting tools and more particularly to rotary slot cutting tools.

Such rotary tools are used to cut slots in solid materials, especially metals, or to separate the solid materials by cutting through the material. These rotary tools comprise discs with centrally keyed mounting apertures and having peripherally disposed cutting elements. The cutting elements, within the scope of the invention, can be integral to the discs, can be fixedly attached to the discs such as by brazing, or can be removably attached to the discs generally by clamping means. Generally, because of the shearing and centrifugal forces, relatively complicated clamping arrangements have been used for retaining the cutting inserts in seats on the discs. Such clamping arrangements besides being costly and time consuming limit the number of inserts on the disc.

The continuous disposal of the chips generated during the cutting operation is a problem that is present in all cutting operations. However the problem is compounded by the use of rotary cutting tools having a plurality of sequential cutting elements, since, for example, in addition to the problem of presently generated chips there is the problem of the chips generated by the prior cutting element unless properly disposed of when generated. To aid in the process of chip removal and to minimize damage to the workpiece by the chips it is conventional to locate the element so that each one cuts only a portion of the total cutting width. For the same purpose, cutting elements having different cutting widths are used. These alternative methods produce narrower chips than the slots and facilitate chip disposal.

The use of staggered cutting elements and elements of different widths decreases the efficiency of the cutting operation. The use of the characterized elements helps solve the problem of minimizing chip damage and of disposing of the chips when the workpiece is rotated. However when the tool uses cutting inserts, such inserts if characterized require even more substantial clamping than non-characterized inserts because of the additional forces generated when forming the narrower chip. The chip disposal problem is further exasperated by the necessity of rigorously clamping the insert into the holder to overcome the centrifugal forces generated by the rotational motion. There are many clamping means available for the retention of inserts. Clamping devices take up room and therefore decrease the number of cutting inserts that can be placed around the periphery of the disc. Also the clamping devices require fasteners that limit the narrowness of the disc which is a problem when the tool is used for narrow slotting such as a saw.

The self-retention of inserts in tool holders are shown in the prior art. For example, U.S. Pat. No. 55,423 shows saw teeth positioned in a circular saw without any obstructing holding or clamping means.

The U.S. Pat. No. 3,785,021 shows a tool holder insert with a clamping arrangement wherein the clamp member clamps by spring effect action. However, none of the prior art patents address the problem of an effective secure retention arrangement for characterized elements in rotary slot cutting tools.

Accordingly it is an object of the present invention to provide new and unique rotary slot cutting tools in which the above referred to problems and disadvantages are substantially reduced or overcome.

According to the present invention an improved rotary slot cutting tool arrangement is provided comprising:
a disc shaped tool,
a plurality of cutting elements around the periphery of said tool, and
means on said cutting elements for narrowing the chips as the chips are formed during the cutting of slots on the workpieces.

To maximize the number of cutting elements on the periphery of the tool, a unique characterization of the cutting element causes the chip to coil into tight compact coils, thus occupying only a minimum amount of space on the periphery of the tool.

The rotary tool uses inserts, in a preferred embodiment, that are retained in the holder by the geometrical characteristics of the holder and the insert, thereby obviating the necessity of special clamping means. The holder includes jaw-like seats for the inserts wherein the contour of the seat matches the contour of the tool holder. In addition the seat may include a spring-like detent which is received in a recess formed in the insert whereby when the insert is placed in the tool holder it is locked in place and removed only by a tool designed for that purpose. Thus, there is no clamping means requiring a minimum thickness of the holder or taking up valuable space on the periphery of the tool.

The cutting elements or inserts are characterized to shape the chips such that the width of the chip is less than the width of the cutting edge of the cutting element; the characterization is preferably in the form of ridges located at and forming part of the cutting surface of the cutting element to thereby shape the chip immediately after being sheared by the straight cutting edges of the insert. By shaping the chip while it is most malleable minimum power is used. The stresses on the formed chip cause it to curl and take a tight helical shape.

In addition the cutting surfaces of the cutting inserts is removed and spaced apart from the top clamping surfaces of the cutting inserts by chip guiding surfaces angled from the cutting surfaces.

Recesses are formed on the tool holder between the inserts for receiving the helically shaped chip. The beginning of the recess has the same angular bias as the chip guiding portion of the cutting insert to facilitate the disposal of the chip during the cutting operation.

Further to enable more cutting inserts per unit of circumferential length, slots are provided in the disc-like tool holder to reduce the strains due to the stresses caused by pressing the inserts into the seats on the holders.

BRIEF DESCRIPTION OF THE DRAWINGS

The operation and utilization of the present invention will become more apparent from the description of a preferred embodiment of the invention taken in conjunction with the accompanying drawings in which.

THE DESCRIPTION OF THE INVENTION

The invention relates to rotary slot cutting tool arrangements for forming slots or parting material. The tool arrangement is shown comprising two portions, namely, a tool holder 1 in the form of a disc having recesses 3 therein for receiving the second portion, i.e. the disposable cutting inserts 8. The cutting inserts are generally formed of hard metals.

It should be understood that although replaceable inserts are shown the invention also includes integral or permanently affixed cutting elements.

The body or tool holder 1 is generally a relatively thin metallic disc having a pair of spaced apart surfaces giving the disc a thickness less than the width of the cut to be obtained by the cutting inserts 8. In the central portion of the tool holder there is an aperture 23 for mounting the tool holder body on a rotary axle. It is conventional to form a keyway in this aperture for keying the disc to the axle.

Figure 2:
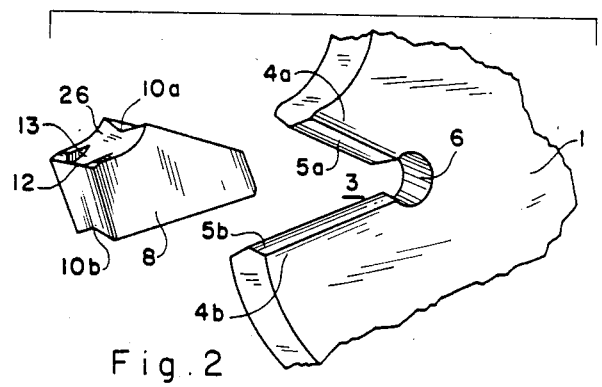
FIGS. 2 and 3 are perspective views of the insert seat and an insert in accordance with different embodiments of the invention where the seats have concave and convex surfaces respectively and the inserts have matchint surfaces.
Figure 4:
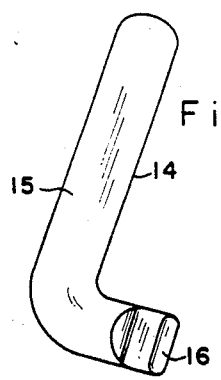
FIG. 4 is a perspective view of one embodiment of a releasing key.
Figure 3:
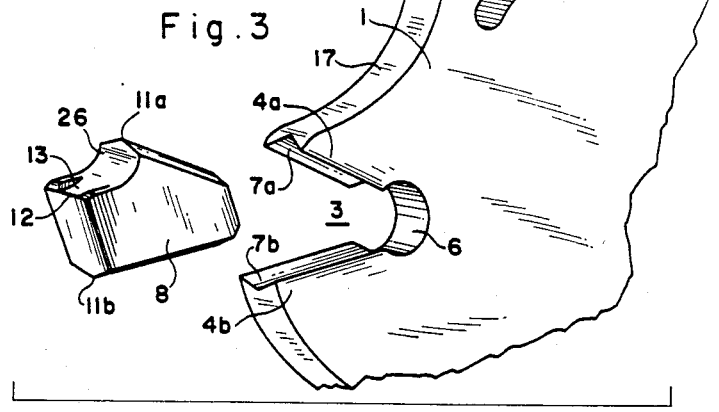

The cutting insert seats 3 correspond to the form of the inserts 8. Above the seats are chip carrying recesses 17 which are used to accommodate the chips in a manner which will be further explained in this specification. The cross-sectional shape of the seating jaws 4a and 4b are shown as convexly V-shaped in FIG. 2 and concavely V-shaped in FIG. 3. At the end of each seat is a release recess 6. A key or tool 15 has a handle 14 with a lever 16 which is inserted in the release recess 6 for forcing the clamplessly held cutting insert from the tool holder.

The disc is formed with elongated arcuate slots such as slot 2 located between the seats on the periphery of the disc and extending toward the central aperture. Slots 2 perform a variety of functions such as compensating for differences of stresses and deformations formed in the body of the tool holder during cutting operation. The slots 2 also add to the springiness of the disc and enable more cutting inserts to be seated on the holder.

Means are provided for locking the cutting insert in place during the cutting operation and also to prevent the cutting inserts from being released in response to the centrifugal forces operating on the cutting inserts. More particularly the geometry of the insert and the seat retain the insert in the seat during operation in spite of the large forces on the insert. The geometry includes the substantially wedge shape of the inserts with prismatic or multiple plane retaining surfaces (10a, 10b, 11a, 11b) (see FIGS. 2, 3) and the matching, retaining wedge shaped surfaces 5a, 5b, 7a, 7b, respectively, of the seats. The inserts are located in the seats 3 in the tool holder by means of an insertion force.

The forces acting on an insert located in a rotary cutting tool comprise cutting forces, forces acting to grip the insert and centrifugal forces arising out of the rotational motion of the tool. Since the act of cutting with rotary tools is intermittent, it is especially important to ensure that the cutting insert is reliably retained in its seat. The insert in this tool is not retained by external clamps, but instead is held by "wedge" forces. When the insert which is wedge shaped is inserted between the seating jaws on the holders, which are also wedge shaped, forces are applied normal to these jaws. These normally directed forces generate frictional forces wich retain the insert even after the forces used to place the insert in its seating have been withdrawn.

Figure 1:
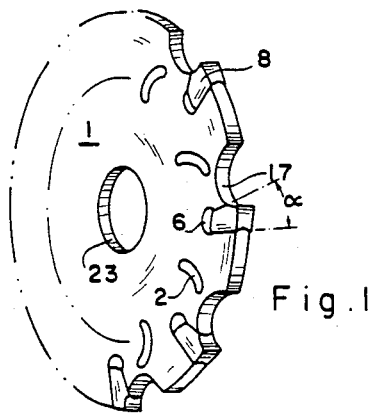
FIG. 1 is a perspective view of the rotary tool arrangement.

It is well known that the less the wedge angle $\alpha$ (see FIG. 1) the greater the magnitude of the normally directed forces for the same insertion forces and as a consequence the frictional retaining forces increase. Thus, as the wedge angle $\alpha$ is reduced the reliability of the retention of the insert is increased as a result of the stronger wedging of the insert in the seating. However, the decrease of the wedge angle is limited because the normally directed forces cause mechanical stresses in the body of the tool holder which could cause its fracture. Thus, the reduction of the wedge angle is limited. In the tools, in accordance with the invention, it has been found that the range of optimal values for the angle $\alpha$ (FIG. 1) is $9° \pm 2°$, the actual optimal value depends on the characteristics of the materials of which the tool and the inserts are made.

Alternatively, the cutting insert includes means such as recess 25a, 25b and 25c for receiving retaining means such as retaining detents 24a, 24b and 24c.

Thus the geometry of the inserts and the holder including the retaining surfaces enable the inserts to remain firmly positioned irrespective of the magnitude of the cutting forces. To dislodge the inserts, forces from the direction of portion 6 of the seating arrangement larger than the frictional holding forces are required.

The concave surfaces 10a and 10b have an advantage over the convex surfaces 11a, 11b when the inserts are formed of hard metals and when there are created in the tool arrangement excess stresses. The insert will fail prior to the failure of the seating in the tool thus safeguarding the tool holder. Similarly the prismatic shapes ensure the stability of the insert in the tool with respect to side forces and especially when alternative righthand or lefthand inserts are used.

In the front portion of the insert is the cutting edge 12 followed by a chip former 13 which: (1) shapes the chip to reduce its width (FIG. 7a) as compared with the width of the slot; (2) forms a ridge which rigidizes the chips; and (3) causes the chip to curl. The ribs on the cutting insert such as ribs 18a, 18b start a small distance from the cutting edge whereby the chip is formed while it is hot due to the cutting operation and therefore in its most malleable state, thus significantly reducing the energy used in forming the chip. Further the placement of the ribs puts stresses in the chips which causes the chips to deform into a tight helical shape.

Figure 5A:
FIG. 5 is a perspective view of a characterized cutting insert having a pair of side ribs for chip forming and also showing, in FIG. 5a the shape of the chip obtained.
Figure 5:
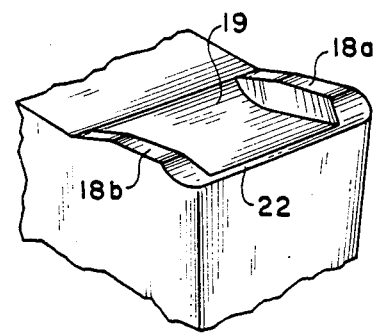

As the chip helix grows it moves upward along the face of the cutting insert and particularly along the angular portion 26 constituting a chip deflector surface between the chip former 13 and the top holding surface such as surfaces 10a or 11a. The surfaces or recesses 17 act as extensions of the deflector surface 26 as the chip helix moves and serves to facilitate the removal of the chip from the workpiece. As shown in the drawings the actual chip former 13 includes the cutting land 22 and has the ridges or ribs 18a, 18b and 20 in accordance with the samples shown in FIGS. 5-7. For example in FIG. 5 the chip former comprises the cutting land 22 leading to a recess 19 defined by two raised side ribs 18a and 18b. The chip formed by the forming portion of the tool in FIG. 5 is shown in cross-section in FIG. 5a.

Figure 6A:
FIG. 6 is a perspective of a characterized cutting insert having a central raised rib allowing for chip forming and also showing in FIG. 6a the form of the chip obtained.
Figure 6:
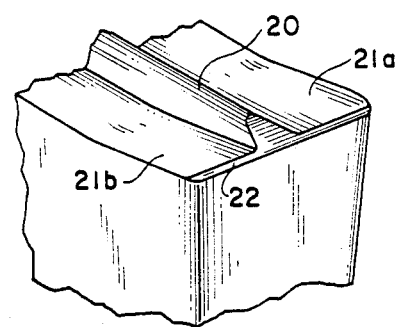

FIG. 6 shows a chip former that includes a cutting land 22 that continues on to a raised central rib 20 and deflector surfaces 21a and 21b on either side of rib 20. The chip formed by the chip former of FIG. 6 is shown in FIG. 6a.

Figure 7A:
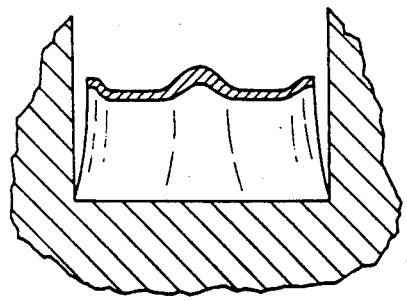
FIG. 7 is a perspective view of a characterized cutting insert having two side ribs and a central rib between the side ribs for chip forming and also showing in FIG. 7a the form of the chip obtained.
Figure 7:
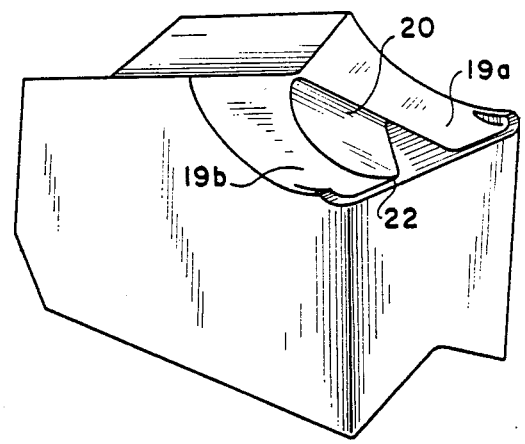
Figure 8A:
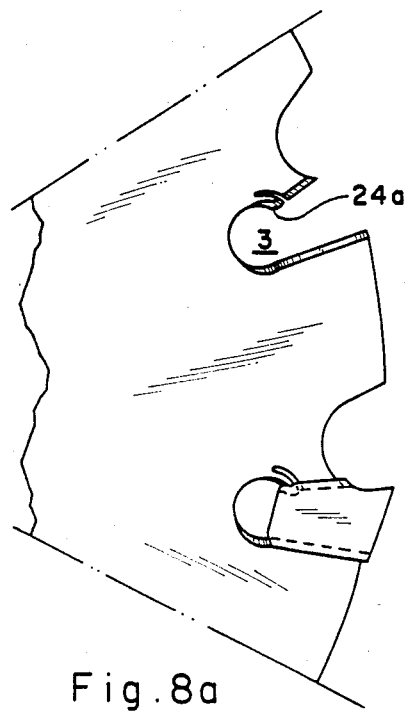
FIGS. 8a, b and c each show other embodiments of the seating arrangement having a spring-like detent for retention purposes.
Figure 8B:
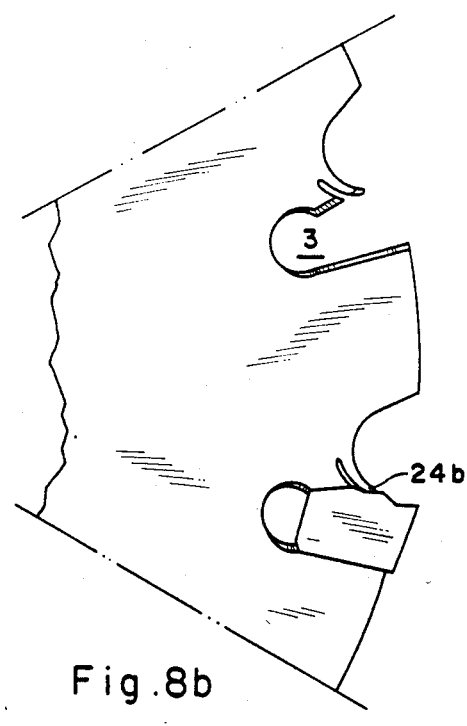
Figure 9A:
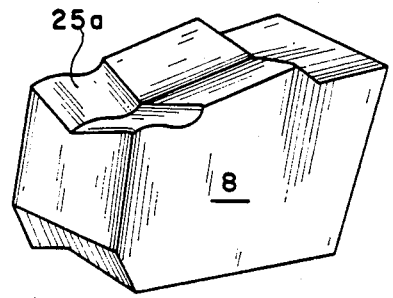
FIGS. 9a, b and c each show an insert in accordance with the invention having a prismatic recess for retention by the spring-like detent within the seating.
Figure 9B:
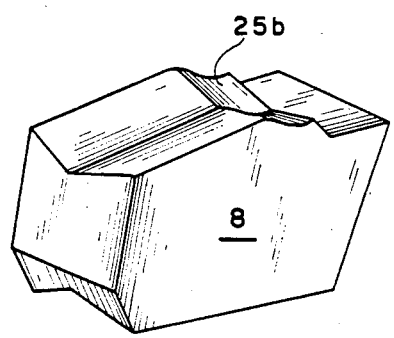
Figure 9C:
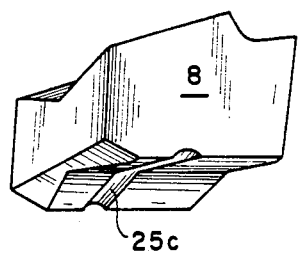
Figure 8C:
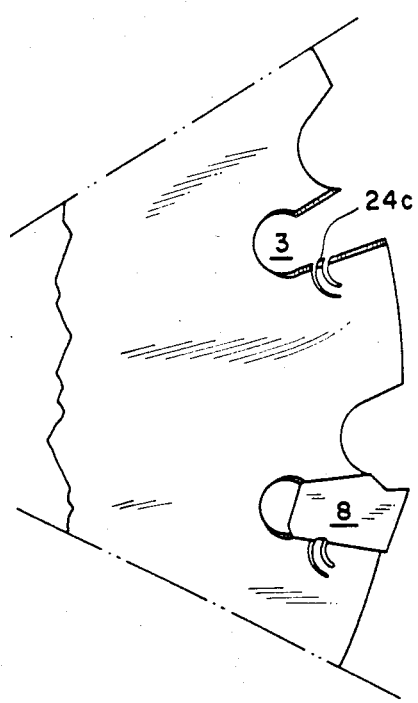

FIG. 7 shows the chip former that includes both a central rib 20 and two deflector surfaces 19a and 19b defined by spaced apart side ribs. The chips formed by the former of FIG. 7 is shown in FIG. 7a which also shows the workpiece to indicate narrowness of the chip as compared to the slot in the workpiece.

The common feature of the chip forming portions of the cutting inserts is that it acts to shape the chip immediately after the cutting operation so that the chip is narrower than the width of the slot being cut. Furthermore the chip is deformed into a compact coil.

Accordingly a tool arrangement is provided wherein the chip is formed using minimum power by a rotary slotting tool with self-locking cutting inserts.

While the principles of the invention have been described in connection with specific apparatus and applications it is to be understood that this description is made by way of example only and not as a limitation on the scope of the invention.

What is claimed is:

1. A cutting insert for inserting into a tool holder of a cutting tool arrangement and comprising a body having a top face, a pair of opposite side faces, a front end face, a straight line cutting edge formed at the join of said top face and said front end face; a land surface formed in said top face substantially coextensive with, parallel to and extending from said cutting edge; a chip shaping rib formed in said top face, separated from said cutting edge by said land surface and extending substantially centrally between, said opposite side faces from said land surface and away from said cutting edge, and a chip deflecting surface formed in said top surface and extending beyond said chip shaping rib towards an edge of said top surface remote from said cutting edge, the arrangement being such that during cutting operations a chip cut by said cutting edge is shaped by said chip shaping means so as to have imparted to it, by said rib, a substantially central ridge thereby resulting in the overall narrowing of the chip which is thereafter deflected by said deflecting surface.

2. An insert as claimed in claim 1 in which the chip shaping means also comprises a pair of spaced apart ribs disposed on opposite sides of the said rib.

3. An insert according to claim 1 wherein said body furthermore comprises a substantially wedge-shaped portion having a pair of side faces forming substantially flush extensions of said first mentioned side faces and upper and lower faces which slope towards each other and towards a rear end face thereof.

* * * * *